W. H. CLARKE.
AUXILIARY WHEEL.
APPLICATION FILED OCT. 25, 1917.
1,263,375.
Patented Apr. 23, 1918.
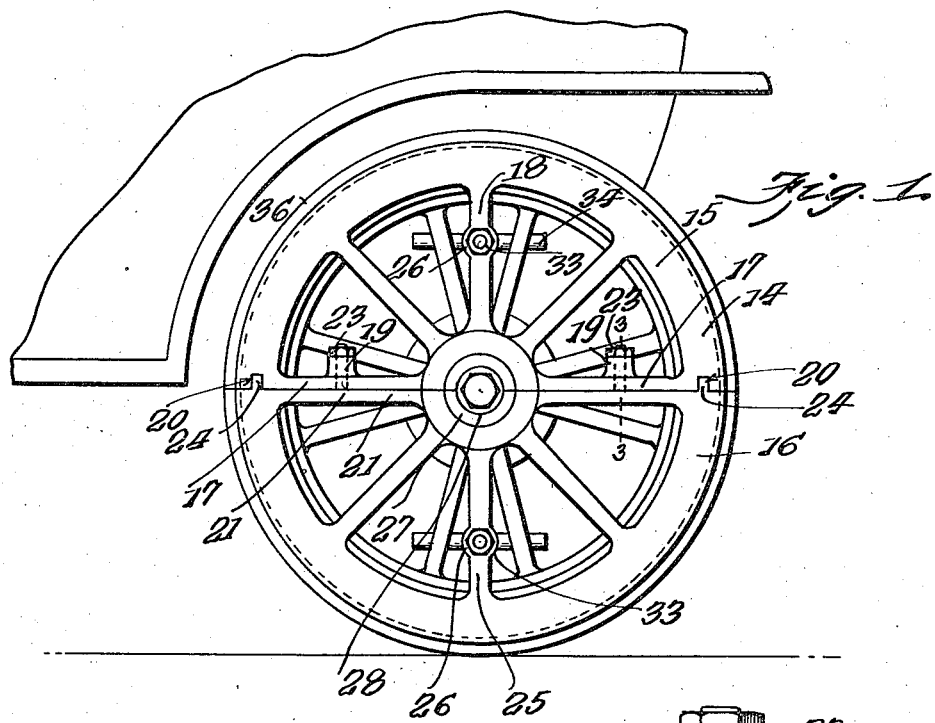
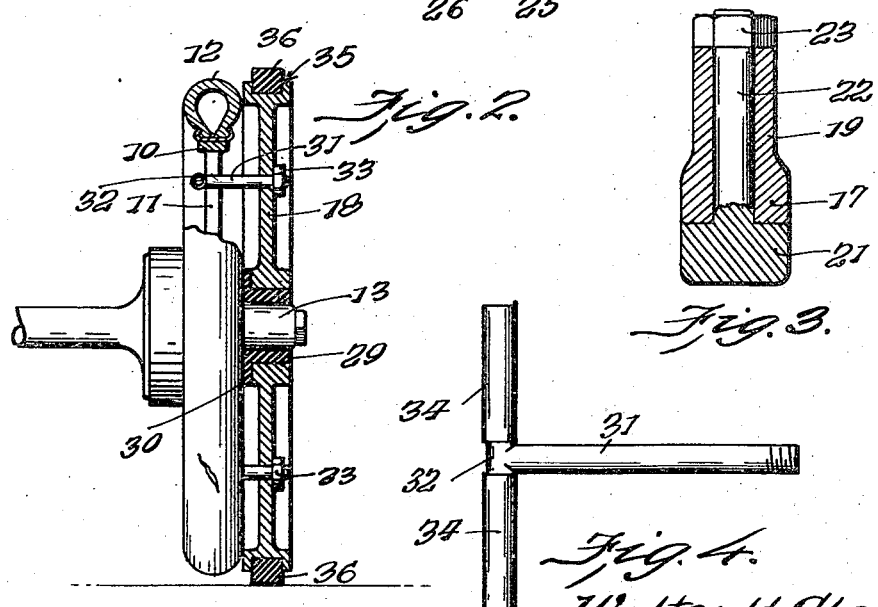
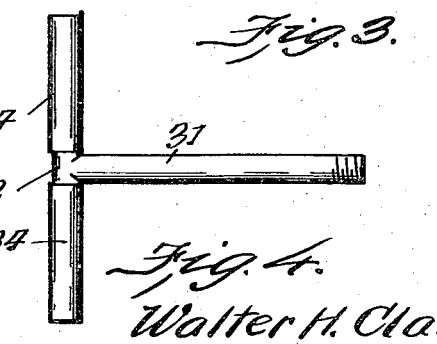
INVENTOR
Walter H. Clarke
WITNESSES
By
ATTORNEY

UNITED STATES PATENT OFFICE.

WALTER H. CLARKE, OF AKRON, OHIO.

AUXILIARY WHEEL.

1,263,375.   Specification of Letters Patent.   Patented Apr. 23, 1918.

Application filed October 25, 1917. Serial No. 198,410.

*To all whom it may concern:*

Be it known that I, WALTER H. CLARKE, a citizen of the United States, residing at Akron, in the county of Summit and State of Ohio, have invented certain new and useful Improvements in Auxiliary Wheels, of which the following is a specification.

This invention has relation to vehicle wheels, and has for an object to provide an auxiliary wheel for motor vehicles, for association or connection to a vehicle wheel bearing a pneumatic tire when the tire becomes disabled whereby to relieve the tire from contact with the ground and to permit the auxiliary wheel to act in the capacity of the disabled wheel to permit the vehicle to be driven to the nearest point where a repair of the disabled tire may be made.

Another object of the invention is to provide an auxiliary wheel for motor vehicles utilizing pneumatic tires adapted for connection to the spokes of the motor vehicle wheel when the tire thereof is disabled, with means for permitting the rapid connection or disconnection of the auxiliary wheel.

A still further object of the invention is to provide an auxiliary wheel for emergency including a wheel formed in sections with means for connecting the sections and securing the same upon the wheel having the disabled pneumatic tire.

A still further object of the invention is to provide an auxiliary wheel for the purpose above described which is simple in construction, comprising few parts, permitting its economical manufacture and manipulation without difficulty.

In addition to the foregoing my invention comprehends improvements in the details of construction and arrangement of the correlative parts to be hereinafter more fully described and particularly set forth in the appended claim.

In the accompanying drawings in which similar and corresponding parts are designated by the same characters of reference throughout the several views in which they appear:—

Figure 1, is a view in side elevation of my auxiliary wheel for vehicles illustrating the same in use.

Fig. 2, is a view in vertical section taken through an auxiliary wheel of my invention illustrating the manner of its connection to an ordinary vehicle wheel.

Fig. 3, is a detail section taken on the line 3—3 of Fig. 1, and

Fig. 4, is a detail view in elevation of one of the bolts for securing the auxiliary wheel to a motor vehicle wheel.

With reference to the drawings 10 indicates a conventional form of vehicle wheel having spokes 11 and a pneumatic tire 12. The hub or hub cap is indicated at 13.

My invention comprises a wheel indicated generally at 14 and which is formed into a pair of semicircular sections, one section being indicated at 15 and the other at 16. The section 15 is formed with a pair of oppositely extending spokes 17 coinciding with the diametrical edge of said section, and other radial spokes, one of said radial spokes 18 being located at a point midway of the spokes 17. The diametrical spokes 17 are formed with recessed bosses or enlargements 19, and each end of the rim of said section 15 of the wheel is formed with a circumferentially extended recess 20.

The other section 16 is likewise formed with a pair of oppositely extending spokes 21 coinciding with its diametrical edge, each of said spokes having an integrally formed bolt 22 extending at right angles thereto for penetrating the apertured enlargement 19 of the adjacent section when said sections are brought together as shown in Fig. 1. The extremity of each of the bolts 22 is threaded to receive a nut 23 whereby when the nut is applied and tightened upon the bolts the sections may be held in proper relation and against relative movement. Each end of the rim of the section 16 is furthermore formed with a projection or stud 24 designed to enter the recesses 20 of the rim of the section 15 to further provide a means for retaining the sections in proper relation and to relieve the strain upon the bolts 22. In a manner similar to the section 15, the section 16 is formed with a radial spoke 25 which is located at a point midway of the spokes 21 and in opposed or diametrical relation to the spoke 18 of the section 15. Each of the spokes 18 and 25 is apertured transversely, the spokes being enlarged as at 26 around said apertures to prevent weakening of the spokes at the point of penetration of the apertures.

In use, the wheel is disconnected and each section applied separately to the disabled vehicle wheel. Each of the sections 15 and 16

16 is formed with a central hub portion 27 each hub portion having a semi-circular aperture 28 to embrace the hub cap 13 of the disabled vehicle wheel, a washer 29 of rubber or other resilient material being embraced about said hub cap prior to the connection of the auxiliary wheel as shown in Fig. 2. The washer 29 may be formed with an annular flange 30 at one end to bear against the hub of the wheel 10 to prevent injury to the surface thereof. It will thus be noted that when the sections 15 and 16 of the auxiliary wheel are connected in the manner previously described, the hub of the auxiliary wheel is held out of contact with the hub of the staple wheel by the interposition of the rubber washer 29 which not only serves as a means for preventing marring of the finish of vehicle wheels, but also serves as a cushioning element. After the sections of the auxiliary wheel are connected the auxiliary wheel is connected to the spokes of the disabled wheel by means of bolts 31, shown in detail in Fig. 4, having a T-shaped head 32 at one end. The shanks of the bolts 31 are inserted between the spokes of the disabled vehicle wheel and into the apertured enlargements 26 of the auxiliary wheel, and the T-shaped heads 32 of the bolts extended across the spokes 11 of the vehicle wheel to prevent withdrawal therebetween when nuts 33 are applied to the threaded terminals of the bolts 31 to secure them in place. The oppositely extending portions of the T-shaped heads 32 of the bolts may be encircled with short sections of rubber tubing or the like indicated at 34 to prevent marring of the surface of the spokes of the vehicle wheel.

Each section 15 and 16 of the auxiliary wheel is formed with a peripheral circumferentially extending recess 35 to receive a semi-circular tire section 36 which may be of solid rubber.

In view of the foregoing it will be apparent that I have provided an auxiliary wheel, which, being formed in sections, permits each section to be handled separately thereby rendering the handling and lifting of the wheel less difficult than were the wheel made in one piece. It will be furthermore apparent that by the use of this device necessity of removing the disabled pneumatic tire or repairing the same is obviated since the auxiliary wheel will form a satisfactory substitute at least to enable the vehicle to be transported to a nearby point whereby the pneumatic tire can be repaired. By providing an auxiliary wheel of a diameter slightly greater than the diameter of the vehicle wheel or tire, the tire is relieved of contact with the road bed thereby preventing injury thereto during transportation of the vehicle. Other uses and advantages will be readily apparent to those skilled in the art to which this invention appertains.

While I have illustrated and described my invention with some degree of particularity, I realize that in practice various alterations thereover may be made and I therefore desire to reserve the right and privilege of changing the form of the details of construction, or otherwise altering the arrangement of the correlative parts without departing from the spirit of the invention or the scope of the appended claim.

Having thus described my invention what I claim as new and desire to secure by Letters Patent is:—

In combination with a motor vehicle wheel, an auxiliary wheel having radial spokes and apertures formed in certain of said spokes, bolts entering said apertures, nuts applied to said bolts adjacent the spokes, T-shaped heads on the other ends of the bolts which are passed between the spokes of the vehicle wheel and then turned to engage the wheel spokes, and tubular sections of resilient material applied to the terminals of said T-shaped heads to engage the spokes of the vehicle wheel to prevent damage thereto.

In testimony whereof I affix my signature in presence of two witnesses.

WALTER H. CLARKE.

Witnesses:
 HARVEY MUSSER,
 M. HERZ.